United States Patent [19]

Langley

[11] 4,369,383

[45] Jan. 18, 1983

[54] LINEAR DC PERMANENT MAGNET MOTOR

[75] Inventor: Lawrence W. Langley, Christiansburg, Va.

[73] Assignee: Kollmorgen Technologies Corporation, Dallas, Tex.

[21] Appl. No.: 72,772

[22] Filed: Sep. 5, 1979

[51] Int. Cl.³ .......................................... H02K 41/00
[52] U.S. Cl. ........................................ 310/12; 310/14
[58] Field of Search ............................. 310/12–14, 310/27, 96

[56] References Cited

U.S. PATENT DOCUMENTS

| | | | |
|---|---|---|---|
| 2,889,503 | 6/1959 | Chambers | 310/126 |
| 3,109,113 | 10/1963 | Henry-Baudot | 310/13 |
| 3,135,880 | 6/1964 | Olson et al. | 310/14 |
| 3,136,934 | 6/1964 | Henry-Baudot | 310/12 UX |
| 3,176,170 | 3/1965 | Fulton et al. | 310/13 |
| 3,259,768 | 7/1966 | Burr | 310/13 |
| 3,265,911 | 8/1966 | Madsen | 310/12 |
| 3,534,203 | 10/1970 | Sommeria | 310/14 |
| 3,581,127 | 5/1971 | Warnett | 310/13 |
| 3,619,673 | 11/1971 | Helms | 310/13 |
| 3,665,227 | 5/1972 | Busch | 310/46 |
| 3,668,499 | 6/1972 | Davey | 310/13 |
| 3,746,937 | 7/1973 | Koike | 310/13 X |
| 3,900,749 | 8/1975 | Carriker | 310/156 |
| 4,247,793 | 1/1981 | Rough | 310/12 |

*Primary Examiner*—Donovan F. Duggan

[57] ABSTRACT

A linear DC permanent magnet motor comprising a wound member having a plurality of windings wound on a slotted magnetic structure and a field member movable relative to said wound member, the field comprising permanent magnet means for developing a magnetic field and means for energizing with DC current at least some of the windings, the magnetic field of said permanent magnet means interacting with the energized windings causing said field member to move relative to said wound member. The motor also comprises support means for maintaining air gaps between the wound member and the field member.

6 Claims, 8 Drawing Figures

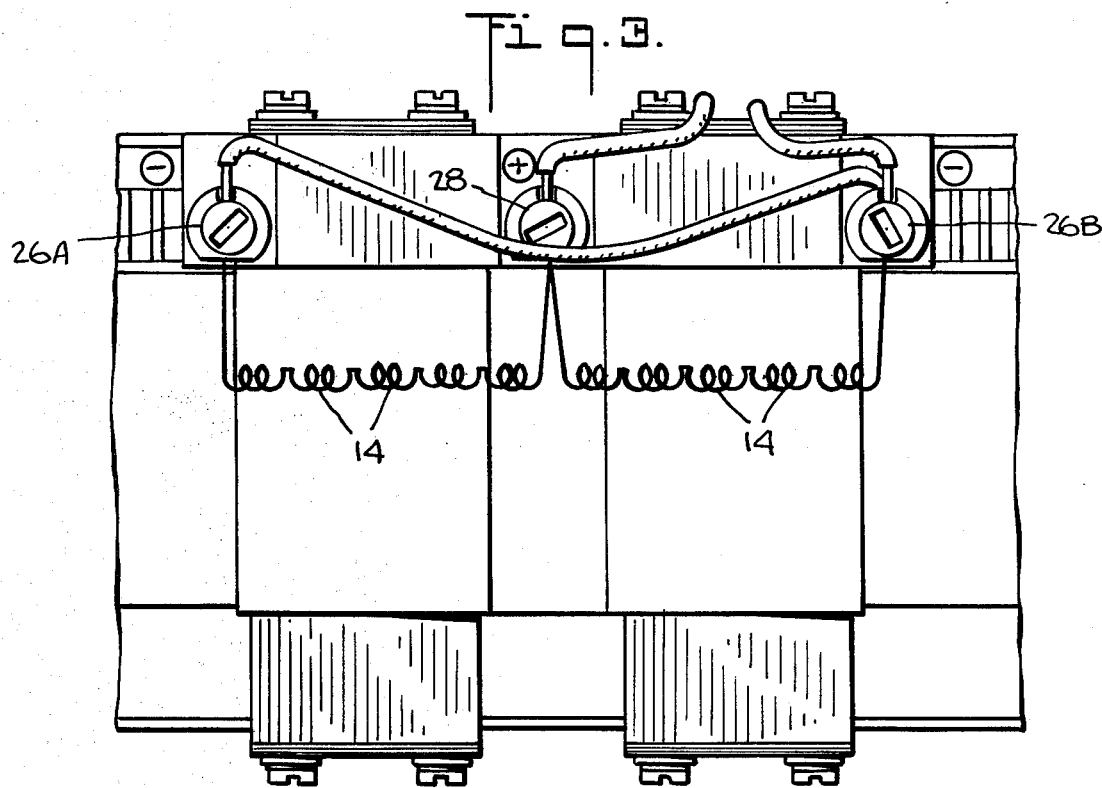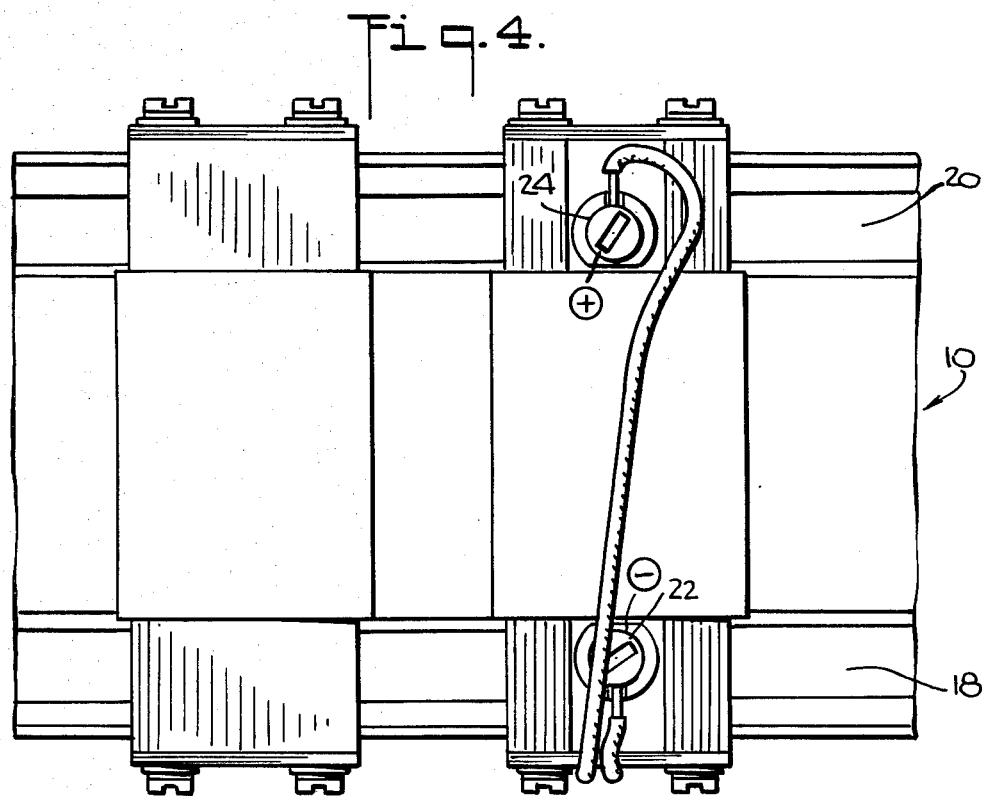

LINEAR DC PERMANENT MAGNET MOTOR

BACKGROUND OF THE INVENTION

The present invention relates to linear direct-current (DC) permanent magnet motors and, more specifically, to linear DC permanent magnet servo motors and linear DC permanent magnet force motors.

Linear motion electric machines are relatively new, compared to rotating electric machines, but are finding increasing applications, because of the absence of gears or other rotary-to-linear converters. A review of linear motors may be found, for example, in the book "Linear Motion Electric Machines," published by Wiley, and authored by S. A. Nasar and I. Boldea. Prior development has concentrated primarily on synchronous or induction linear motors. Thus, a two-sided linear induction motor used for suspended vehicles is described in U.S. Pat. No. 3,895,585 to Peter Schwärzler. Linear, synchronous motors are disclosed in U.S. Pat. No. 3,706,922 and U.S. Pat. No. 3,594,622 to Junpei Inagaki. A propulsion arrangement employing a linear motor is disclosed in U.S. Pat. No. 3,884,154 to Fritz Marten. A linear stepper motor is disclosed in U.S. Pat. No. 4,037,122 to Gilbert Bonner and Joseph Dessel.

For some applications linear DC motors are preferable to linear induction or synchronous motors. For example, DC linear motors are particularly suitable for short-stroke applications. One of the factors limiting the use of linear electric motors is the low efficiency these motors have demonstrated in the past. This usually results from having only part of the windings under the poles at any one time, while power is being dissipated in all the windings. This is the limiting factor in the so-called voice coil motor. For this reason, voice coil motors with strokes longer than about one inch are very inefficient. Another limiting factor is the large attractive forces between various parts of the motors, which necessitate heavy supporting structures and/or close tolerance control of opposing elements having an air gap therebetween. Providing these forces and/or tolerances over long linear distances is expensive. Finally, until a very few years ago the peak forces produced by a linear motor were severely limited by demagnetization effects, except in the case of ceramic magnets, whose energy to weight ratio was too low for practical application in these motors.

BRIEF DESCRIPTION OF THE INVENTION

The present invention relates to linear DC permanent magnet motors having a wound member and a field member. The wound member may be stationary or movable. The wound member comprises a series of windings on a slotted magnetic structure. In some embodiments the wound member has a series of commutator bars connected to the windings. Some embodiments with commutator bars also have slip bars adapted for connection to a DC source.

The field member may be stationary or movable. When the field member is movable, it may take the form of a slider which travels along the wound member. In those embodiments where the wound member comprises slip bars and commutator bars, the field member comprises slip bar brushes, which slidably engage the slip bars, and commutator brushes connected to the slip bar brushes, which slidably engage the commutator bars, thereby energizing the windings.

The field member also comprises permanent magnets which develop magnetic field which interact with the currents in the energized windings, thereby causing relative movement between the field member and the wound member. The force produced by the motor has a magnitude directly proportional to the current in the windings and a direction which is a function of the direction of that current. Since only those windings under the poles of the field member are energized, the unenergized windings and the magnetic structure form a large heat sink, which contributes to the high continuous power rating.

The motor of the present invention also employs support structure to maintain "air gaps" between the field member and the wound member. As used herein "air gap" means a space between the field member and the wound member, filled with non-magnetic material, preferably air. Other non-magnetic materials may, however, be employed.

In a preferred embodiment the permanent magnets associated with the field member are rare earth permanent magnets. In another preferred embodiment the wound member includes longitudinal side plates of a material such as stainless steel which enhances heat dissipation. To further increase heat dissipation, the side plates may be finned and/or liquid cooled. In another preferred embodiment the field member is in two parts and the air gaps are substantially equal. In another preferred embodiment the wound member is in two parts and the air gaps are substantially equal.

One preferred method of commutation employs brushes and commutator bars. Another preferred method of commutation employs solid state switching devices. A still further preferred method of commutation employs commutator bars, slip bars, commutator brushes and slip bar brushes.

One preferred support structure comprises wheels mounted on the field member for riding on side plates mounted on the wound member. In another preferred embodiment the wound member is attached to the frame of a machine and the field member is supported by a slide forming a part of that same machine. In this embodiment the air gaps are established by the relationship between the slide and the frame of the machine.

A preferred application for the motor of the present invention is servo positioning characterized by precision position and rapid response time. Another preferred application is a force motor in which the force developed is a function of current and independent of position. A still further preferred application is in high speed positioning since the motor of the present invention is not limited by lead screw whip or similar mechanical restraints.

BRIEF DESCRIPTION OF THE DRAWINGS

The instant invention will be better understood with the aid of the following drawings which form a part of the specification and in which:

FIG. 3 is a top plan view of the preferred embodiment of FIG. 1 with the windings shown schematically;

FIG. 4 is a bottom plan view of the preferred embodiment of FIG. 1;

DETAILED DESCRIPTION

Figure 1:
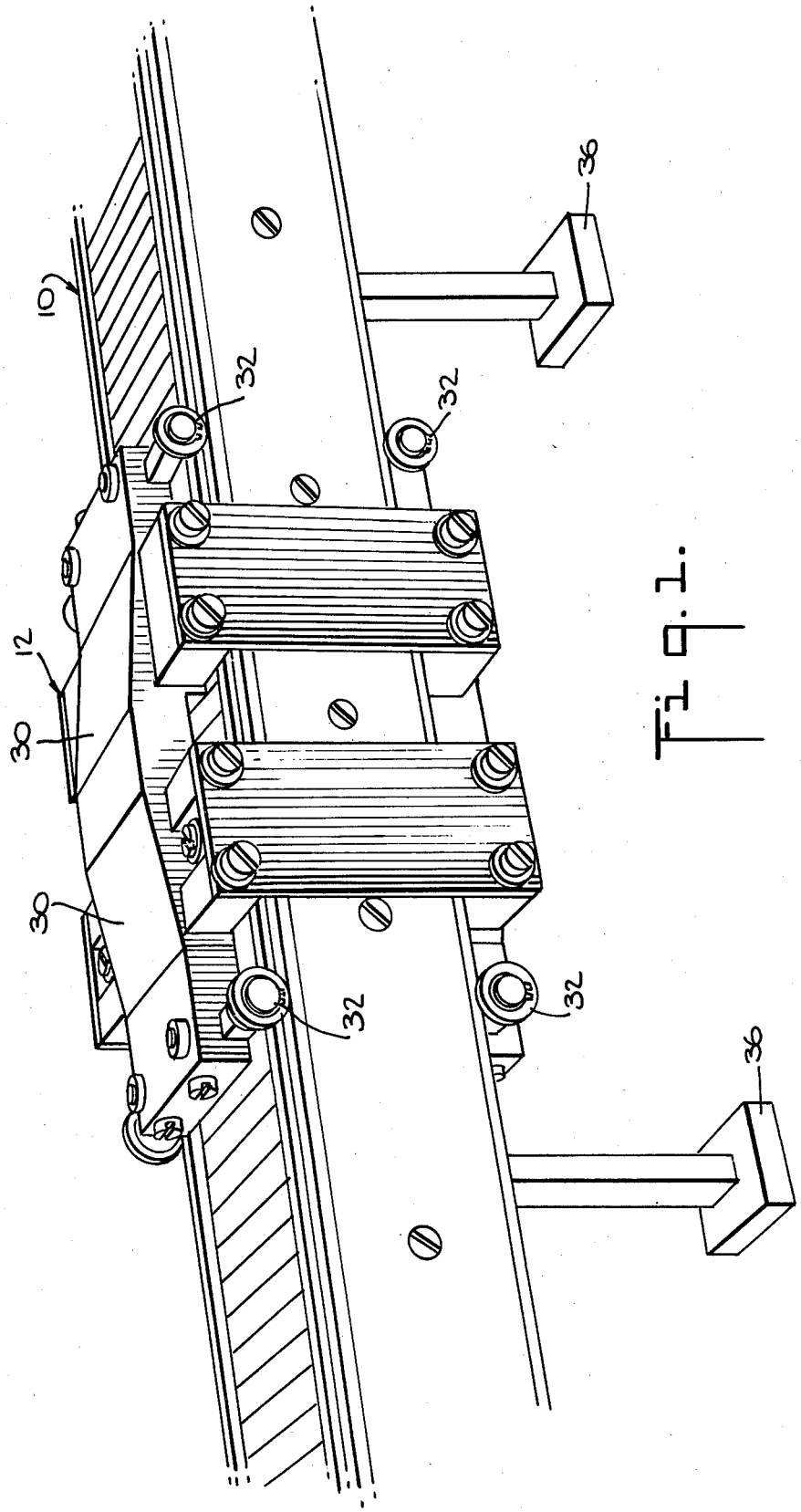
FIG. 1 is a perspective view of one preferred embodiment of the linear DC permanent magnet motor according to the present invention.

Referring now to the drawings, FIG. 1 shows a linear DC permanent magnet motor constituting one preferred embodiment of the instant invention. A stationary wound member 10 is shown extending in the longitudinal direction. A movable field member 12 is adapted to travel in the longitudinal direction along wound member 10.

Figure 5:
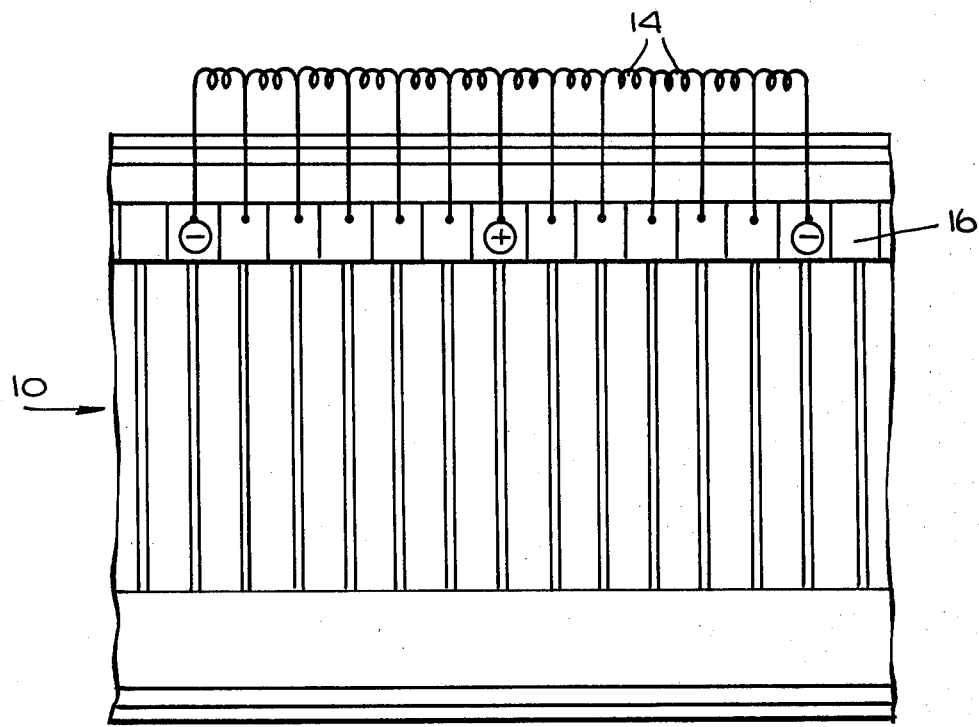
FIG. 5 is a top plan view of the wound member of the preferred embodiment of FIG. 1 with the windings shown schematically.
Figure 6:
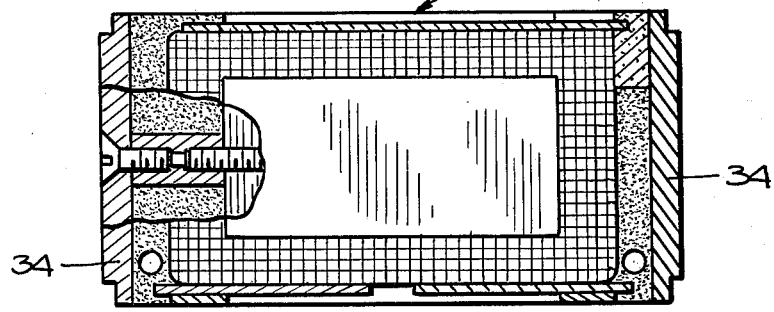
FIG. 6 is a cross-sectional view of the wound member along the lines VII—VII of FIG. 2.

Stationary wound member 10 contains a plurality of windings 14, shown schematically in FIGS. 3 and 5. In the preferred embodiment of FIG. 1, the windings 14 are formed by rotating the magnetic structure on its longitudinal axis to form coils which run through opposed slots on the wound member (FIG. 6). This technique provides coils having the minimum length of end turn and, therefore, the minimum resistive losses. This too contributes to the high continuous power rating of the motor. The ends of each winding 14 are connected to adjacent commutator bars 16 (FIG. 5), one of which is in the slot of the winding. It will be understood, however, that other winding techniques may be employed. Wound member 10 also contains slip bars 18, 20 (FIG. 4), which are adapted for connection to a source of DC power, such as a servo amplifier, which is conventional and forms no part of the present invention. Wound member 10 may be suspended or supported by means of supports 36 (FIG. 1).

Figure 2:
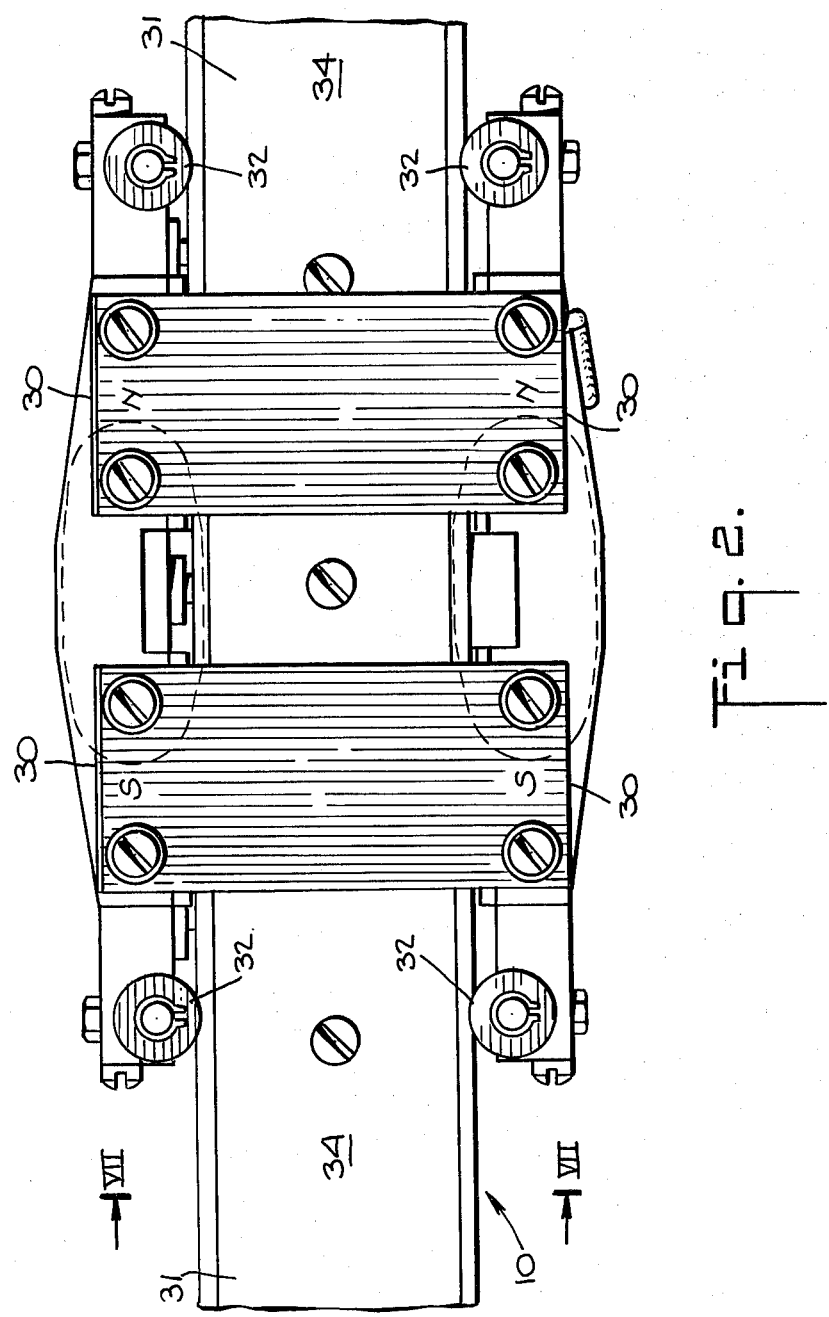
FIG. 2 is an elevational view of the preferred embodiment of FIG. 1.

Movable field member 12 travels along wound member 10 on wheels 32 (FIGS. 1 and 2). Field member 12 comprises slip bar brushes 22, 24 (FIG. 4), commutator brushes 26A, 26B and 28 (FIG. 3) and permanent magnets 30 (FIGS. 2, 3 and 4). Slip bars 18, 20 are adapted for connection to a DC source. Slip bar brushes 22, 24 slidably engage slip bars 18, 20. Commutator brushes 26A, 26B are connected to slip bar brush 22, while commutator brush 28 is connected to slip bar brush 24. Commutator brushes 26A, 26B and 28 engage individual commutator bars 16, thereby energizing windings 14.

Permanent magnets 30 develop magnetic flux which interacts with the current flowing through the energized windings 14 thereby causing field member 12 to travel along wound member 10. In the preferred embodiment of FIG. 1 permanent magnets 30 are rare earth permanent magnets which produce surprisingly high force ratings and contribute to low cogging. The low cogging is also due to the spacing of the pole pieces relative to the slots in the wound member.

In the preferred embodiment of FIG. 1, only those windings under the poles of field member 12 are energized. The remaining unenergized windings serve as an effective heat sink and contribute to the high continuous power rating of the motor. In addition, wound member 10 employs side plates 34 (FIGS. 2 and 6) preferably formed from a material such as stainless steel, which has good thermal conductivity, to further dissipate the heat, and which has a good bearing surface for the field member support wheels 32. If additional heat dissipation is desired, side plates 34 may be finned or cooled by passing liquid through passages formed therein. Side plates 34 may also be used as a mold face for molding the field member 10 in epoxy.

It should be noted that the currents under the poles of permanent magnets 30 are in opposite directions. Thus, one end of field member 12 has a pair of north poles while the other end has corresponding south poles (FIG. 2). Thus, currents in opposite directions produce aiding forces in a direction depending on the direction of the current through windings 14.

The following data were developed from a motor constructed in accordance with the preferred embodiment of FIG. 1.

| Dimensions: | | |
| --- | --- | --- |
| Stator Height | | 1.90 in. |
| Width | | 3.87 in. |
| Weight | | 16 lbs/ft |
| Slider Height | | 3.70 in. |
| Width | | 4.65 in. |
| Length | | 6.90 in. |
| Weight | | 5.40 |
| Performance Characteristics: | | |
| Peak Force | $F_p$ | 55 lb. |
| Continuous Force | $F_c$ | 25 lb. |
| Power Input at Peak Force at 25° C. | $P_p$ | 570 watts |
| Force Constant at 25° C. | $K_F$ | 2.3 lb/watts |
| No Load Speec at $V_p$ | $v_{NL}$ | 89 in/s |
| Electrical Time Const. | $\tau_E$ | 4.6 ms |
| Static Friction | $F_F$ | 1.25 lb. |
| Maximum Winding Temperature | | 155° C. |
| Temp. Rise Per Watt | TPR | 0.44° C./Watt |
| Ripple Force (average to peak | $F_R$ | 4.5% |
| Ripple Frequency | | 35.3 cycles/ft |
| Theoretical Max. Acceleration | $aN_L$ | 326 ft/s$^2$ |
| Inertia | $J_s$ | 0.17 lb.s$^2$/ft |
| Winding Parameters: | | |
| Voltage at $F_p$ | $V_p$ | 29.3 volts |
| Peak Current | $I_p$ | 19.5 amperes |
| Force Sensitivity | $K_I$ | 2.82 lb/A |
| Back EMF Constant | $K_B$ | 0.33 V per in/s |
| DC Resistance at 25° C. | $R_M$ | 1.5 ± 0.2 ohms |
| Inductance | $L_M$ | 6.9 mH |

Figure 7:
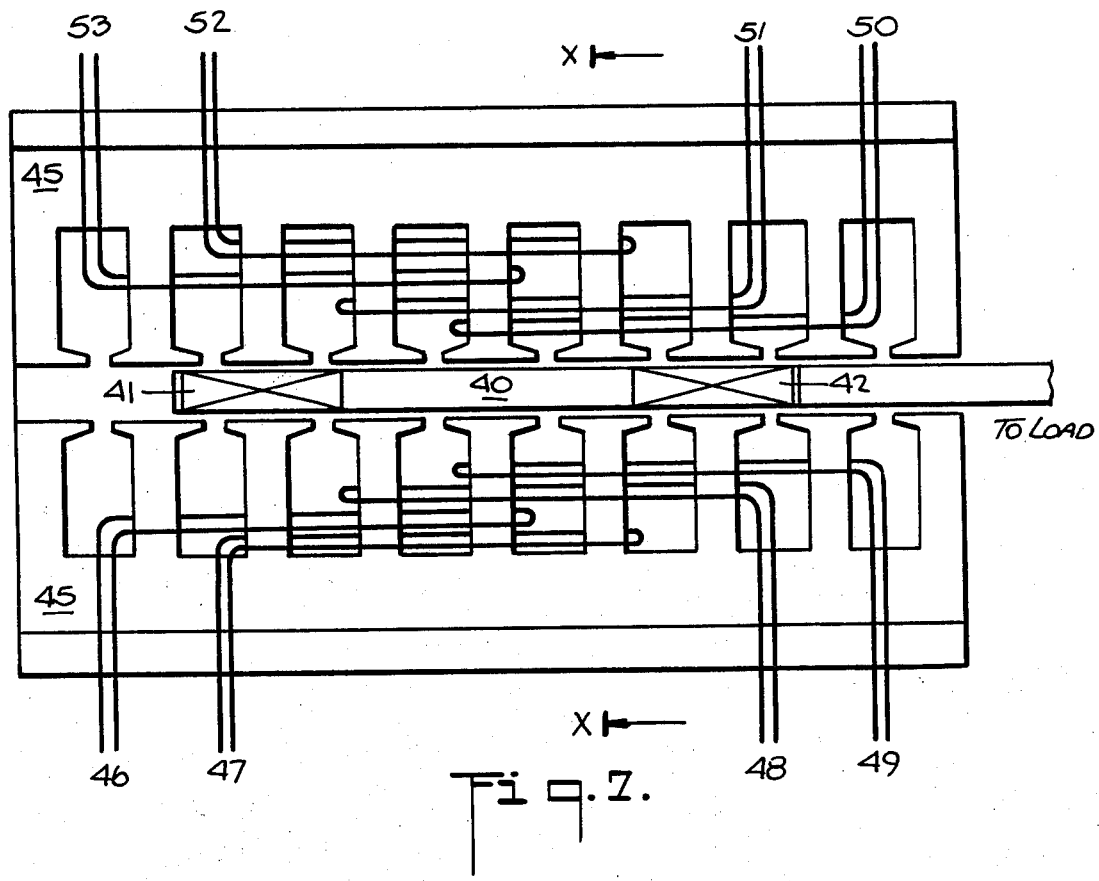
FIG. 7 is an elevational view, in section, of a second preferred embodiment of the linear DC permanent magnet motor according to the present invention.
Figure 8:
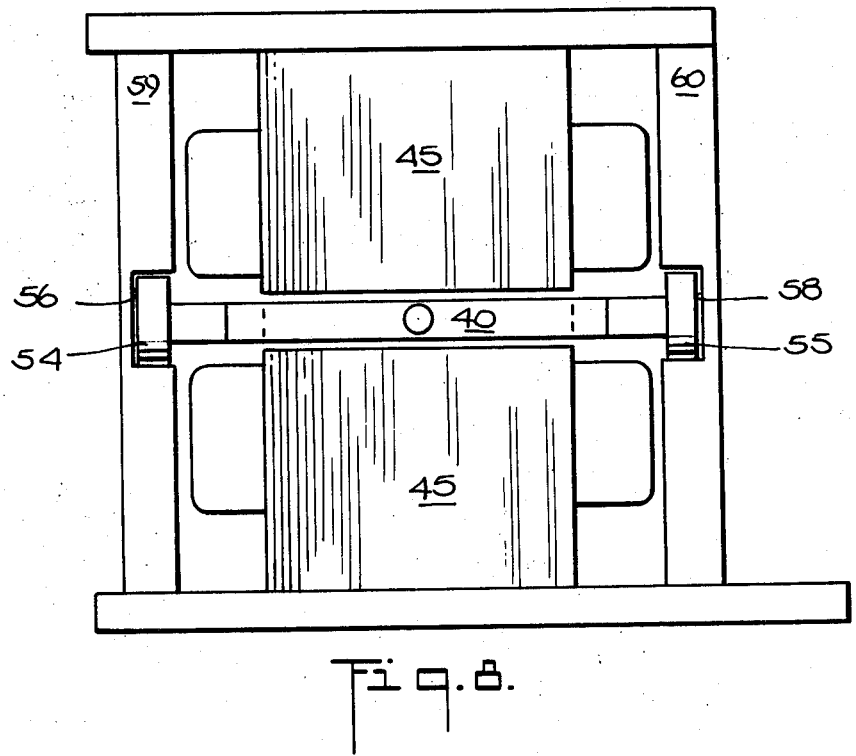
FIG. 8 is a sectional view along the lines X—X of FIG. 7.

FIGS. 7 and 8 show a second preferred embodiment of the linear DC permanent magnet motor of the present invention. The motor of FIG. 7 comprises a field member 40 having permanent magnets 41 and 42 and a wound member 45 having eight windings 46, 47, 48, 49, 50, 51, 52, 53, wound on a slotted magnetic structure. Windings 46 through 53 are lap windings and have a pitch equal to that of permanent magnets 41, 42. Although shown for purposes of simplicity in FIG. 7 as consisting of but a single turn, it will be understood by those skilled in the art that each of windings 46 through 53 preferably consists of multiple turns.

Whereas in the preferred embodiment of FIG. 1 a two-part field member was employed, in the preferred embodiment of FIG. 7 a two-part wound member is employed. In the embodiment of FIG. 7 the air gaps between field member 40 and wound member 45 are preferably equal and permanent magnets 41, 42 are preferably rare earth permanent magnets.

FIG. 8 shows field member 40 supported by wheels 54, 55, which ride in channels 56, 58 in side plates 59, 60. This maintains the air gaps between field member 40 and wound member 45 and allows field member 40 to move along the longitudinal axis of wound member 45 in response to currents in the energized windings thereof.

In the preferred embodiment of FIG. 7, the linear motor has a limited stroke. All of the windings are energized at the same time, the direction of motion of the field member being determined by the direction of current flow. Thus, the preferred embodiment of FIG. 7 does not employ commutation and, therefore, may be regarded as a special class of DC brushless motor.

Although the instant invention has been described with respect to two preferred embodiment, it will be understood that many variations and modifications will now be obvious to those skilled in the art. For example, although in the preferred embodiments the wound member has been shown stationary and the field member moving, the present invention may also be employed with the field member stationary and the wound member moving. Thus, the scope of the invention is limited, not by the specific disclosure herein, but only by the appended claims.

I claim:

1. A linear DC permanent magnet motor comprising:
   a stationary wound member, said wound member comprising at least two slip bars adapted for connection to a DC source, a plurality of electrically energizeable windings wound on a slotted magnetic structure and a plurality of commutator bars connected to said windings;
   a movable field member comprising permanent magnet means for developing a magnetic field, at least two slip bar brushes adapted to engage said slip bars and at least three commutator brushes for energizing with direct current some but not all of said windings at any one time, said second commutator brush being physically located intermediaate said first and third commutator brushes along the longitudinal axis of said wound member, said second commutator brush being electrically connected to one of said slip bar brushes and said first and third commutator brushes being electrically connected to the other of said slip bar brushes, the magnetic field of said permanent magnet means interacting with said energized windings causing said field member to move relative to said wound member to selectively and progressively energize said windings; and
   support means for maintaining air gaps between said wound member and said field member.

2. The motor according to claim 1 wherein said permanent magnet means comprises rare earth permanent magnet means.

3. The motor according to claim 1 or 2 wherein said field member is in the form of a two-part slider.

4. The motor according to claim 3 wherein said wound member comprises side plates which dissipate heat generated in the windings.

5. The motor according to claim 3 wherein said motor is a servo motor.

6. The motor according to claim 3 wherein said motor is a force motor.

* * * * *